Feb. 7, 1956 J. A. RAJCHMAN 2,733,861

MAGNETIC SWITCHING SYSTEM

Filed Aug. 1, 1952 4 Sheets-Sheet 1

INVENTOR
JAN A. RAJCHMAN
BY Morris G. Pelton
ATTORNEY

Feb. 7, 1956 J. A. RAJCHMAN 2,733,861

MAGNETIC SWITCHING SYSTEM

Filed Aug. 1, 1952 4 Sheets-Sheet 2

INVENTOR
JAN A. RAJCHMAN
BY Morris L. Rabkin
ATTORNEY

Feb. 7, 1956 J. A. RAJCHMAN 2,733,861

MAGNETIC SWITCHING SYSTEM

Filed Aug. 1, 1952 4 Sheets-Sheet 3

INVENTOR
JAN. A. RAJCHMAN
BY Morris A. Rabkin
ATTORNEY

INVENTOR
JAN A. RAJCHMAN
BY Morris L. Rabkin
ATTORNEY 2,733,861

MAGNETIC SWITCHING SYSTEM

Jan A. Rajchman, Princeton, N. J., assignor to Radio Corporation of America, a corporation of Delaware Application August 1, 1952, Serial No. 302,161

19 Claims. (Cl. 235—61)

Figure 2:
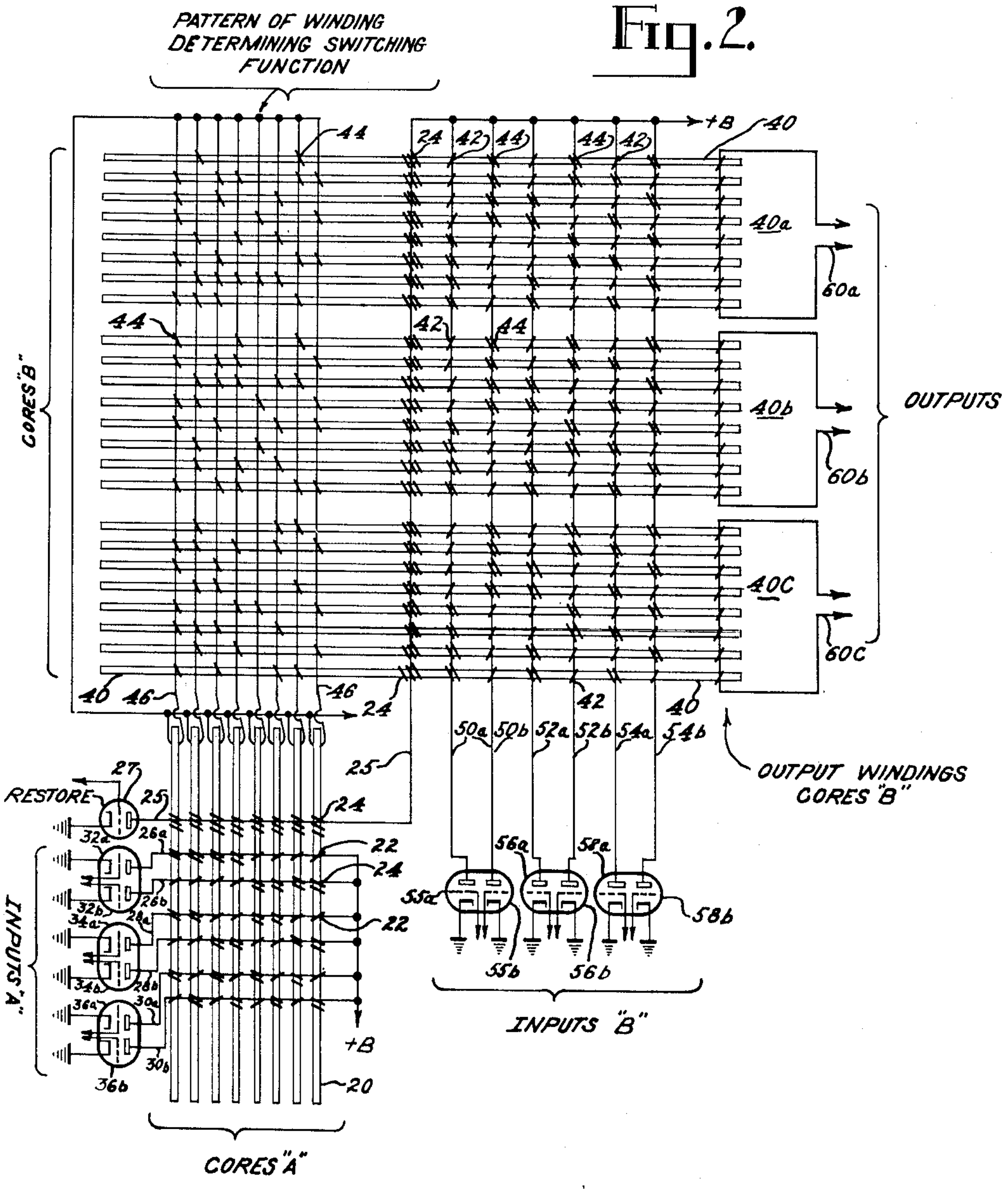

This invention relates to switching devices and more particularly to an improved magnetic switching system.

Any switching operation can be generally defined as a definite correspondence function between a certain number of inputs and a certain number of outputs. Apparatus to provide such a correspondence function has been described in Patents Nos. 2,428,211 and 2,428,212 to J. A. Rajchman, wherein resistance matrices have been used. A rectifier system for performing switching operations is described in "Rectifier Networks for Multiposition Switching" by Brown and Rochester in the February, 1949, Proceedings of the I. R. E. There also may be found in the literature descriptions of function matrices using multigrid tubes, triodes and vacuum diodes.

While these switching systems are adequate to perform the switching functions for which they were designed, there are inherent limitations in the apparatus employed. These limitations include component failures, the requirement to continually inspect tubes and crystals to try to anticipate failures, excessive power dissipation with components used, and a limited life for the components, other than resistors.

It is an object of this invention to provide a novel switching system, which has substantially unlimited life.

It is a further object of the present invention to provide a novel switching system which is substantially free of failures.

Still a further object of the present invention is to present an improved switching system which is highly efficient.

Another object of this invention is to provide an improved, novel and simple switching system.

In an application by this inventor for "Magnetic Matrix and Computing Devices" which was filed March 8, 1952, Serial No. 275,622, there is described a novel magnetic switch. This consists of a number of torodial cores of magnetic material and a number of coils. The magnetic material selected for the toroidal cores is preferably of the type having a substantially rectangular hysteresis loop. Each of the coils is inductively coupled to different ones of the magnetic elements or cores by windings. The sense of the windings as well as the elements to which a coil is coupled are determined in accordance with a desired code. The code is selected so that any one of the magnetic cores may be driven from a given starting polarity to the opposite polarity by exciting, with current, selected ones of the coils so that the core selected to be driven is the one which receives magnetomotive forces only from coil windings having a sense to provide the required drive, and from no coil windings of the opposite sense. Each of the cores has a winding, referred to as an output winding, in which a voltage is induced when the core, to which the winding is coupled, is turned over. A restoring coil is coupled to each one of the cores and has an exciting current applied to it to restore all cores to a given initial polarity.

In an application filed May 24, 1952, Serial No. 289,913, by this inventor, there is described a magnetic switching system wherein a plurality of magnetic torodial cores and a plurality of coils are employed. These coils are divided into two groups. The first group consists of input coils which are inductively coupled to different ones of the magnetic elements by windings, the sense of the winding as well as the elements to which a coil is coupled being determined in accordance with a first combinatorial code. The second group consists of output windings which are inductively coupled to different ones of the magnetic cores by windings, the sense of the winding as well as the elements to which a coil is coupled being determined in accordance with a second combinatorial code which is functionally related to the first code. Accordingly, excitation of selected ones of the input coils turns over only one core with the results that voltages are induced in only those output coils which are inductively coupled to that core. Therefore, the application of currents to the input coils in accordance with one code results in a certain output voltage pattern in accordance with the desired interrelationship of the first and second codes. A coil which is inductively coupled to all cores serves to restore all the cores to a given initial polarity.

The present invention is an improvement over the system described in application Serial No. 289,913 in providing a magnetic switching system which can provide any desired switching function, achieving this result with many less cores being required than are required by the previous system. This is effectuated by employing a first plurality of cores and a first plurality of pairs of input coils which are inductively coupled to the cores by windings which have their sense and/or the element to which they are coupled determined in accordance with a first combinatorial code as was previously described. A second plurality of cores divided into groups of cores is provided. Each of the first plurality of cores has an output coil coupled thereto which hereafter will be called a transfer coil. The transfer coil is inductively coupled by windings to each one of the first plurality of cores and also to cores in the groups of cores in accordance with a second code which is related to the first code. Another set of coils is coupled by windings to the cores in the groups of cores in accordance with a third code which is related to the other codes. The groups of cores have output windings which are coupled to all the cores in a group. Excitation is applied to selected coils in each of the sets of input coils. One core in the first plurality of cores will be selected and driven from its initial condition of polarity at N to P, thus causing a voltage to be induced in the transfer coil coupled thereto. The coils which are coupled to the cores in the groups of cores have the sense of their windings opposite to the sense of the windings of the transfer coil. Accordingly, any core which has upon it an excited transfer coil winding and an excited winding of the other sets of coils will not be driven whereas the cores in the groups having only one of the excited windings will be driven from N to P if the magnetomotive force being applied is in that direction. Output voltages are induced in the output coils coupled to the cores which are driven. Means are provided to restore all cores to an initial condition of polarity.

Figure 1:
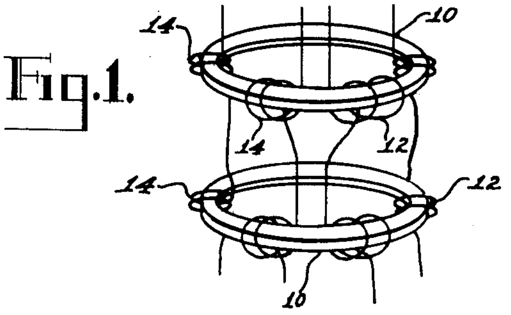
Figure 3:
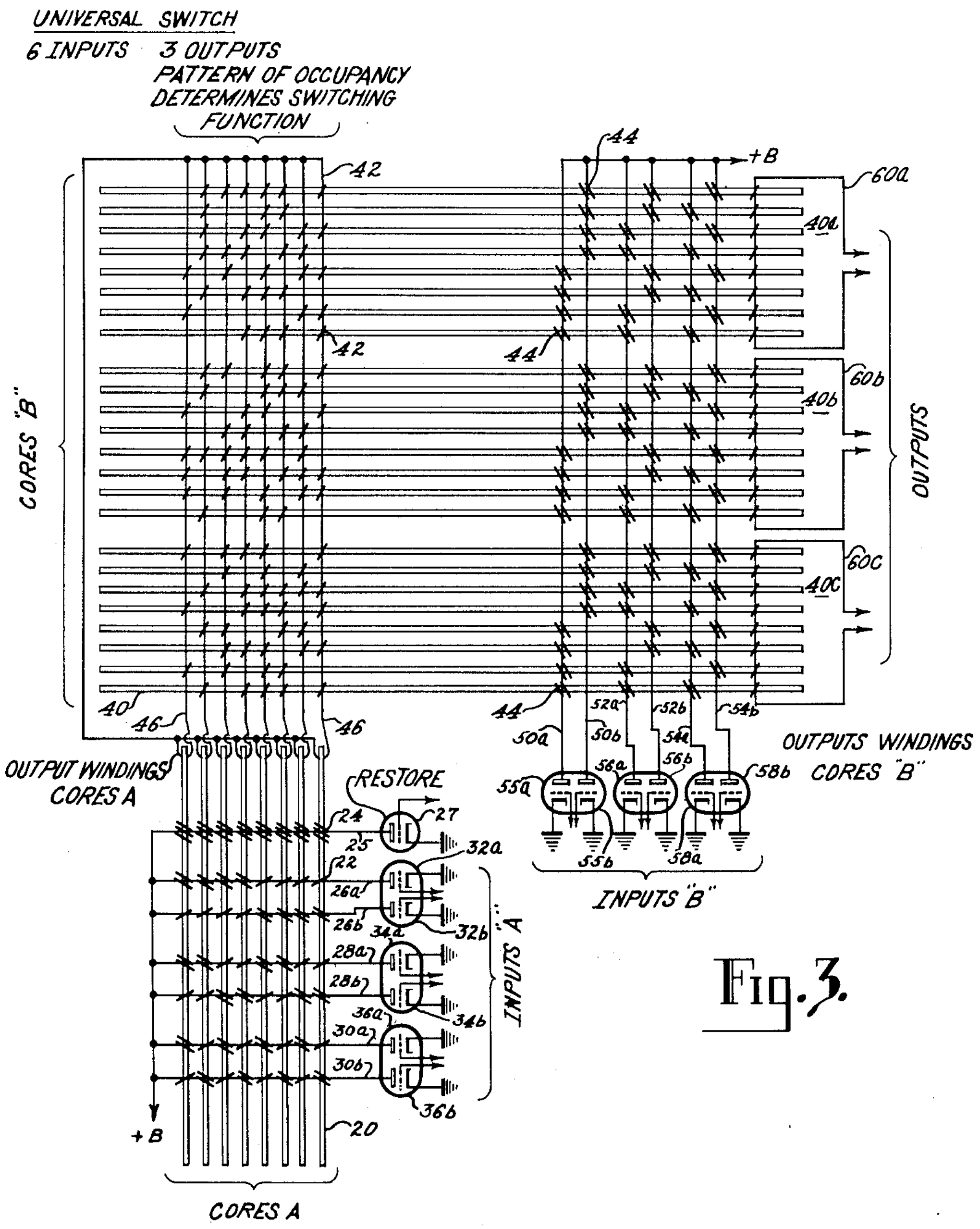
Figure 4:
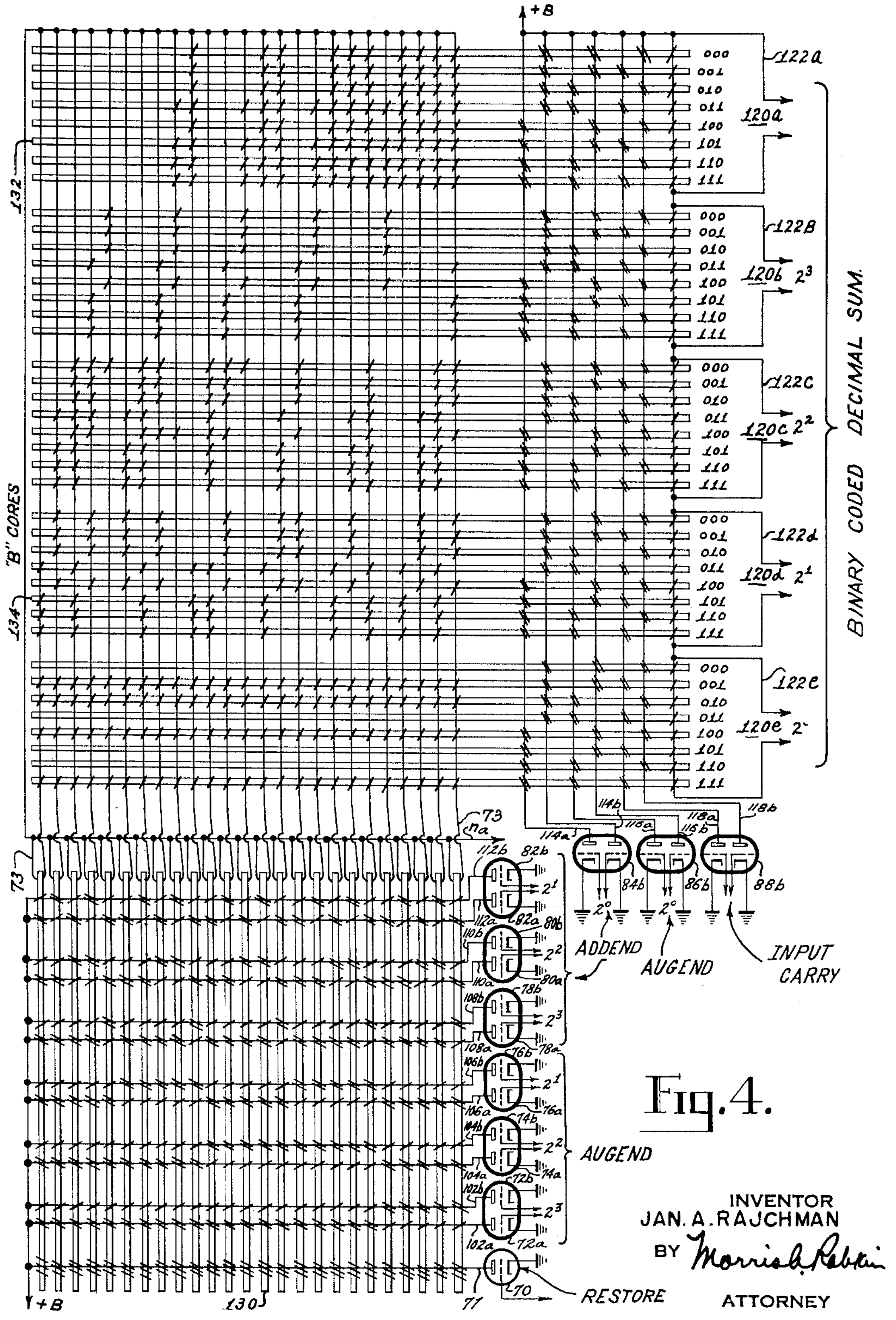
Figure 5:
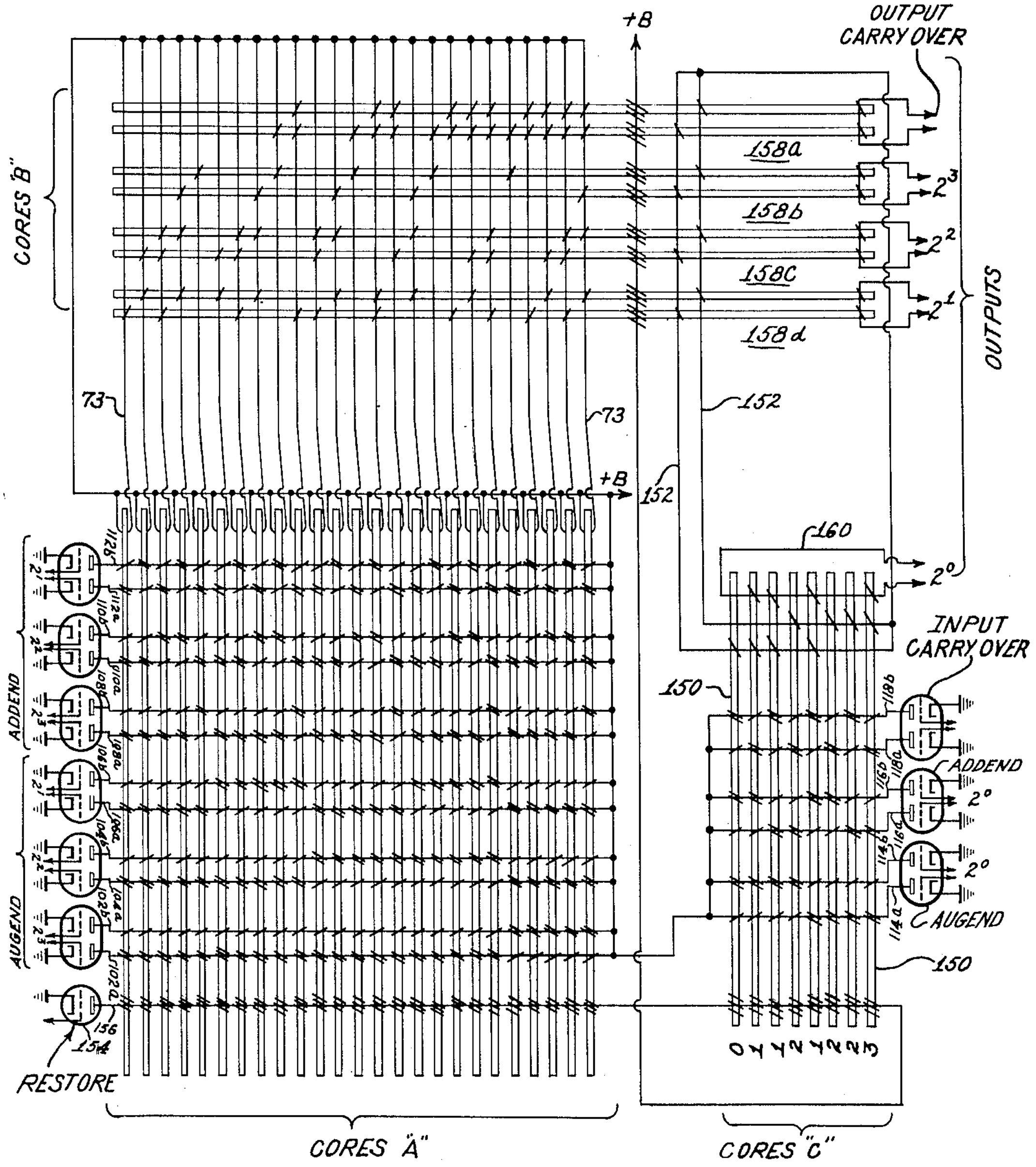

The novel features of the invention as well as the invention itself, both as to its organization and method of operation, will best be understood from the following description, when read in connection with the accompanying drawings, in which Figure 1 is a perspective view of toroidal cores and windings shown for the purpose of facilitating the explanation of the invention, Figures 2 and 3 are circuit diagrams of different embodiments of the present invention, and Figures 4 and 5 are circuit diagrams of two other embodiments of the present invention adapted to perform a mathematical operation.

Reference is now made to Figure 1, wherein there may be seen two cores 10. These cores are made of magnetic material having a substantially rectangular hysteresis loop. The shape preferred for the cores is toroidal. However, other suitable shapes may be used and it is not intended to limit the invention by this showing of the preferred embodiment. The cores 10 have windings 12, 14 upon them. These windings when excited by current provide magnetomotive forces which tend to drive the cores to saturation at one or the other polarity. The two windings 12 which drive a core in a first direction may have arbitrarily assigned thereto the designation of the "P" windings. The other windings 14 may have the designation of "N" windings. P windings 12 of one core may be serially connected with N or P windings of another core to comprise a coil. When the serially connected windings are all of one sense the coil is designated as an N or P coil, depending upon the sense of the windings.

As was previously described above in the discussion of application Serial No. 275,622 by this inventor, each one of the cores in a switch has a plurality of P and N windings thereon. The cores are usually placed in the same magnetic starting condition, for example, with an N polarity. The core which has applied thereto a magnetomotive force in excess of a critical value will be driven to the condition P. All other cores do not receive a magnetomotive force in excess of the required critical value and remain in condition N. Some of these cores may also receive a magnetizing force in the direction N, but since they are already saturated in the N direction there is substantially no change in their condition. By proper selection of the ratio of turns for the P windings and the N windings it is possible to construct a switch wherein a selected core receives a substantial P magnetomotive force. All other cores receive either no magnetomotive force at all or else receive a magnetomotive force in the direction N. The method for selection of the turns is described in application Serial No. 275,622.

Reference is now made to Figure 2 of the drawings, where there is shown an embodiment of the invention in schematic circuit form. In view of the difficulties entailed in showing the winding turns on each of a large number of cores, a modified representation of the cores and the windings is employed in Figures 2, 3, 4 and 5, in order to preserve simplicity in the drawings and to provide a readily understood drawing. The convention adapted for these drawings is that the cores are represented by elongated rectangles such as those designated by the reference numerals 20, 40. The coil windings are represented by the lines 22, 24, 42, 44 that pass at an angle through the rectangle. A line through these angled lines 22, 24, 42, 44, represents the interconnection of the windings. Such interconnections form coils 26*a*, *b*, 28*a*, *b*, 30*a*, *b*. The angled line which represents the windings may form an angle to the left or to the right with the cores. Hold the drawing in the normal manner. Now, if the angled line lies in the first and third quadrants about the intersection (counted in the customary counterclockwise direction of mathematics), then it slants to the right; and if in the second and fourth quadrants, then it slants to the left. If it is an angle to the left, such as is identified by reference numerals 24, 44, the line represents a winding providing a magnetomotive force in the direction N. If the angle is to the right, as identified by reference numerals 22, 42, the line represents a winding providing a magnetomotive force in the direction P. More than one line represents more than one turn of the winding. This will become more clear with the subsequent description.

In the embodiment of the invention of Fig. 2 there are two sets of cores, the first set of which is designated as cores A, 20, have three pairs of input coils 26*a*, *b*, 28*a*, *b*, 30*a*, *b*. Each pair of input coils has a pattern of occupancy of its windings 22, 24 upon the cores in accordance with a first code. That is, the sense of the windings of a pair of coils has one order from left to right to represent a digit one in a binary code, and a second order to represent a digit zero in a binary code. For example, the pair of coils 26*a*, 26*b* next to the coil 25 which is coupled to all the cores by N windings, hereinafter referred to as the N restore coil 25, has the windings on the core farthest away from the vacuum tubes 32*a*, *b*, 34*a*, *b*, 36*a*, *b* in the order PN. It may be noted that the other pairs of input coils on the same core are also in the order PN. If this order is established to represent the binary digit zero, then the reverse order of the windings of a pair of input coils may represent binary digit one, this order obviously being NP. The NP order of the windings of the input coils is found on the core closest to the vacuum tubes 32*a*, *b*, 34*a*, *b*, 36*a*, *b*.

The input coils 26*a*, *b*, 28*a*, *b*, 30*a*, *b* are respectively excited by means of the vacuum tubes 32*a*, *b*, 34*a*, *b*, 36*a*, b. These vacuum tubes have one of the input coils connected to its anode as a plate load. All the coils are connected to a common source of B+.

A second plurality of cores 40 hereinafter designated as the B cores which are divided into core groups 40*a*, *b*, *c* is shown in Figure 2. Each one of the A cores 20 has an output coil 46 coupled thereto. This output coil is hereinafter designated as the transfer coil 46. The transfer coil is inductively coupled to one of the A cores and, by windings 44, to cores 40*a*, *b*, *c* in each of the core groups into which the B cores are divided. The cores in each of the core groups are selected in accordance with a desired code which is related to the input code in a desired manner. It should be noted that the sense of the windings of the transfer coils is in a direction N.

A second set of input pairs of coils 50*a*, *b*, 52*a*, *b*, and 54*a*, *b* is provided. These input coils in the second set are coupled to the B cores by windings 42, 44. The order of the sense of the windings of the second input pairs of coils is determined by a third code which is related in a desired manner to the first and second codes. Each one of the core groups 40*a*, *b*, *c* has an output coil 60*a*, *b*, *c* which is coupled by windings to each one of the cores in a group. The second input pairs of coils are respectively connected to vacuum tubes 55*a*, *b*, 56*a*, *b*, 58*a*, *b* as plate loads and have their other ends connected to a source of B+. The common N restore coil 25 is connected by N windings 24 to each of the cores 20, 40 in the A and B groups. This N restore coil is excited by a single driver vacuum tube 27. When this tube is excited, it turns over all the cores to the direction N which are not already in N.

In operation, all the cores are preset in the N direction. Excitation is applied to a desired one of each pair of coils in the input coils to the A group of cores and also simultaneously to a desired one of each pair of coils in the input coils to the B group of cores. This selective excitation is obtained by applying appropriate signals to the grids of the vacuum tubes coupled to the selected cores from signal sources (not shown). These signal sources may be any of the systems which are well known in the art by means of which a plurality of signals may be simultaneously applied. One core in the A group of cores will receive magnetomotive force in a P direction from all the excited P windings coupled thereto. This selected core will be driven to have the polarity P. This core is selected by virtue of the fact that every other core will have magnetomotive forces applied thereto but these are either all in a direction N or if in a direction P do not exceed the critical value required to drive the core from N to P. The means for core selection is merely to determine which of the coils on a core are coupled thereto by P windings and then excitation is applied to only those coils. The turnover of the selected A core from N to P induces a voltage in the transfer coil 46 coupled thereto. This has the effect of applying magnetomotive forces in a direction N to each one of the cores B to which the transfer coil is connected by windings in the N direction.

The excitation of the one coil in each pair of coils 50*a, b,* 52*a, b,* 54*a, b,* in the second set of input coils serves to apply magnetomotive forces to drive in a direction P certain B cores in each of the groups of cores 40*a, b, c.* The ones of these cores which receive only P driving forces from the second sets of input coils can be readily determined by seeing which core has excited only the windings in a P sense coupled thereto. Others of the B cores receive magnetomotive forces from both the P and N coils which are insufficient to provide the P magnetomotive force in excess of the required critical value and therefore these cores are left in the condition N. Considering only those cores which receive sufficient force to drive them in the direction P, these cores will be so driven unless there is a coupling winding thereon from the excited transfer coil. This excited transfer coil provides, as indicated previously, a magnetomotive force in the direction N. This serves to cancel or reduce the magnetomotive force in a direction P below the required critical value. Accordingly, only those cores of the B cores are turned in the direction P which do not have coupled thereto an excited transfer coil.

It can therefore be seen how, by determining the code or pattern of the couplings to the A cores for the primary selection and the windings to the B cores for the secondary selection, only those cores in each of the groups will be driven by the first and second inputs which are selected in accordance with the predetermined codes. The B core which is driven from N to P will induce a voltage in the output winding and thus manifest the fact that a core has been selected in the particular group in which an output voltage is evidenced in the output coil.

It can be seen that the windings of the transfer coils serve to provide inhibiting forces upon the action of the windings of the second sets of input coils.

Consideration must now be given to the effects of the turnover of the B cores on the A cores as a result of the selection process. The current flowing in the transfer windings of an A core is a loading current which tends to oppose the magnetization of the A core from N to P. This requires that the current applied to the first set of input coils coupled to the A core must be sufficiently large to reverse the core from N to P in spite of this loading current. The currents induced in a transfer coil due to the reversal of a B core from N to P serves to magnetize any A core connected thereto in an N direction. Since the A core is already in the direction N, this effect is not a harmful one. However, these currents do serve as a load which tends to oppose the reversal of the B cores. Consequently, the currents in the second sets of input coils must be sufficiently large to provide for these loads. In order to enable sufficient inhibiting effect, the number of turns in the transfer coil on an A core is made much larger than the number of turns of the winding of the transfer coil on each of the B cores. Since there are many transfer coil windings (a transfer coil is coupled to quite a number of B cores) it is practical to make these transfer coil windings as small as possible, a fact which automatically facilitates making the number of turns of the windings of a transfer coil coupled to an A core large when compared to the number of turns of the windings coupled to the B cores.

Restoration of A and B cores to condition N has the effect of inducing voltages in the coils on the A core being restored to apply or maintain the B cores in condition P. However, if the number of windings in the N restore coils on the B cores is sufficiently large this effect will be readily overcome.

Reference is now made to Figure 3 of the drawings which shows a circuit diagram of an embodiment of the invention which uses the same number of inputs as does the embodiment shown in Figure 2 but which avoids some of the drawbacks of the first embodiment and is in many ways simpler. The identical switching function as was used in the first embodiment of the invention was chosen, but as can be seen in the drawing, many fewer windings coupling the second pairs of input coils to the B cores are required. The first pairs of input coils are coupled to the A cores using the same code pattern as was described for the A cores shown in Figure 2. Accordingly, similar reference numerals are applied thereto, since the function is identical. The pattern of occupancy of the windings 42 of the transfer coils 46 upon the groups of B cores in Fig. 3 is identical with those in Fig. 2 except that these windings have their polarity or sense reversed so that magnetomotive forces are applied from any one of the transfer coils to the cores 40 to which they are inductively coupled to drive these cores in a direction P. The second pairs of input coils 50*a, b,* 52*a, b,* 54*a, b* this time serve as the coils which provide the inhibiting magnetomotive forces. They are coupled to the B cores by windings having a sense only in the N going direction. It will be noted that the pattern of occupancy of the second sets of input coil pairs is identical with the pattern of occupancy of all the N windings of the second set of input coil pairs shown in Figure 2. All that has been done here is to omit all the P going windings in the second sets of input coil pairs. Each group of cores 40*a, b, c* as before, has its own output windings 60*a, b, c* coupled to each core.

Operation of the magnetic switch shown in Figure 3 is the same as operation of the switch shown in Figure 2. Excitation is applied to the grids of each one of the driving tubes selected in the pairs of driving tubes in the A input which results in only P going forces being applied to a selected core. When this one core turns over, the transfer coil coupled thereto has induced therein a voltage which provides P going magnetomotive forces to the cores in each of the groups to which this excited transfer coil is coupled. Simultaneously with the A core excitation, excitation is applied to one coil in each pair of the coils in the second input coils resulting in all the cores in each group of cores being inhibited except for one core in a selected core group. This core group accordingly has the one core turn over from N to P and an output results in the output coil coupled thereto.

An N restore coil 25 is coupled to each one of the A cores. When the A core which was driven in a direction P is restored by this N restore coil, there is induced a voltage in the transfer coil coupled thereto which applies N magnetomotive forces to each one of the B cores coupled to the transfer coil. Accordingly, the B cores, as well as the A cores, are restored to the condition without the necessity for specific N restore coils being coupled to the B cores.

From the above description, it may be seen that when the first and second input coils are excited there will be an output from the groups of cores which has a core therein which has a P drive from the transfer coil connected thereto and no inhibiting forces from the second sets of input cores. The only interfering effect to consider in this embodiment of the invention is the tendency of a reversing B core to magnetize toward the P direction unselected A cores to which this core is coupled by the transfer coil. This effect is substantially eliminated by making the transfer coil winding turns large in number on each of the A cores when compared to the number of winding turns on the B cores. It should be noted that this effect is counteracted to a great extent by the N driving currents which the first input coils apply to all the cores in the A group. The N winding turns are usually made larger in number than the P winding turns on any core.

In order to initially set all B cores to condition N, all the A cores may initially be driven to condition P and then the N restore coil on the A cores may be excited. This will apply N restore forces not only to the A cores but in being returned from P to N there will be induced in all the transfer coils currents which drive all the B cores to the initial setting N.

It is possible to make commutator switches which have any number of cores and these need not necessarily be a power of 2. Only such cores in the A and B groups need to be provided which correspond to the actually occurring combinations of the A and B core inputs with the desired outputs. All of the groups of cores need not contain the same number of cores, since the code relationships may be as arbitrary as desired for a desired switching function.

As an illustration of the versatility of this switch, an example is shown in Figure 4, of a circuit diagram of a switch which may be employed for the addition of two decimal digits coded in the binary form with a binary coded decimal result. Nine inputs are required (the two sets of four digits for the addend and augend and the input carryover digit from a previous addition). There are five outputs for the sum (the four digits of the binary coded decimal digit output and the output carryover digit). For the addition of two decimal digits and the carry in the binary form, there are required 200 possible combinations of inputs. For a switch designed in accordance with the principle set forth in application Serial No. 289,913, filed May 24, 1952, 200 cores would be required. According to the principle illustrated herein, the same switching may be accomplished with only 65 cores. This may be done as follows:

The nine inputs are divided into two groups, the first group, which is the input to the A cores and will be designated as the A input requires six inputs. These six inputs are taken to be the first three most significant digits of the augend and the first three most significant digits of the addend. The input to the B cores are the least significant remaining digits of the addend and augend and an input carryover. There are only five combinations of the three most significant digits of a binary coded decimal digit (in the so-called "pure" binary coded form), so that there are only 25 possible combinations of the A inputs. These 25 possible combinations are shown in the following table:

| Augend Input | | | | Addend Input | | | |
|---|---|---|---|---|---|---|---|
| Signals | Windings | | | Signals | Windings | | |
| 000 | NP | NP | NP | 000 | NP | NP | NP |
| 000 | NP | NP | NP | 001 | NP | NP | PN |
| 000 | NP | NP | NP | 010 | NP | PN | NP |
| 000 | NP | NP | NP | 011 | NP | PN | PN |
| 000 | NP | NP | NP | 100 | PN | NP | NP |
| 001 | NP | NP | PN | 000 | NP | NP | NP |
| 001 | NP | NP | PN | 001 | NP | NP | PN |
| 001 | NP | NP | PN | 010 | NP | PN | NP |
| 001 | NP | NP | PN | 011 | NP | PN | PN |
| 001 | NP | NP | PN | 100 | PN | NP | NP |
| 010 | NP | PN | NP | 000 | NP | NP | NP |
| 010 | NP | PN | NP | 001 | NP | NP | PN |
| 010 | NP | PN | NP | 010 | NP | PN | NP |
| 010 | NP | PN | NP | 011 | NP | PN | PN |
| 010 | NP | PN | NP | 100 | PN | NP | NP |
| 011 | NP | PN | PN | 000 | NP | NP | NP |
| 011 | NP | PN | PN | 001 | NP | NP | PN |
| 011 | NP | PN | PN | 010 | NP | PN | NP |
| 011 | NP | PN | PN | 011 | NP | PN | PN |
| 011 | NP | PN | PN | 100 | PN | NP | NP |
| 100 | PN | NP | NP | 000 | NP | NP | NP |
| 100 | PN | NP | NP | 001 | NP | NP | PN |
| 100 | PN | NP | NP | 010 | NP | PN | NP |
| 100 | PN | NP | NP | 011 | NP | PN | PN |
| 100 | PN | NP | NP | 100 | PN | NP | NP |

On the other hand, all the combinations of the B inputs are possible. Consequently, there are in general eight cores in each of the five output groups of cores.

The entire schematic diagram for the switching system is illustrated in Figure 4 of the drawings. Six pairs of tubes 72—82*a*, *b* driving six pairs of input coils 102—

**112*a*, *b* are provided for the three most significant digits of the augend and the three most significant digits of the addend. The pattern of occupancy for the windings of these six input coils 102—112*a*, *b*, is determined in accordance with the principle previously set forth, namely, that the order of the windings of any coil pair in a given direction (left to right) on a core is established to represent the digit 1 or zero. Referring to Table I, this winding pattern is in accordance with the binary digits shown in the table. The coils which are inductively coupled to the A cores are each driven by the vacuum tube for which they serve as the plate load. The coils are all connected to a common B+ source. If the uppermost core of the A group is designated as the core on which the windings represent zero (namely, winding order NP) then it is necessary to excite in each of the first input coil pairs the coil 102*b*—112*b* on the right side for the purpose of turning over the uppermost core. These right sided coils serve to excite only the P windings on this uppermost core. Since this uppermost core is designated as the zero core, the coils 102*b*—112*b* which must be excited to turn this core over will be designated as the "0" coils. The other coils 102*a*—112*a* in the first input set will be designated as the "1" coils. As in the previous embodiments, each of the A cores has a transfer coil 71** coupled to it and to selected ones of the cores in each group of the B cores whereby when an A core is driven from N to P, P driving magnetomotive forces are applied to each B core coupled to the A core by its transfer core.

Turning attention now to the second input coil pairs **114—116*a*, *b* or B input coils, it will be noted that the pattern of occupancy of the B input coil windings is the same in each group of B cores 120*a*, *b*, *c*, *d*, *e*. Here again if the uppermost core in each group is designated as the zero core, since the second input coil windings are inhibiting windings, in order to permit an uppermost core to be driven from N to P, no inhibiting magnetomotive forces can be applied thereto. This requires that the coils in the second input group that are excited be the ones that do not apply a magnetomotive force to this uppermost core. Consequently, the left coil 114*a*, 116*a*, 118*a* in each coil pair in the second or B inputs will be considered as the zero ("0") coil. The right coil 114*b*, 116*b*, 118*b* in each coil pair accordingly will be considered as the "1" coil. Each one of the cores in a B group 120*a–e* is coupled by a winding to a common output coil 122*a–e***.

The next determination required is to establish which of the groups is to represent which figures in the sum. Assume the top group of cores **122*a* provides an output which represents a binary decimal sum carryover, the next group of cores 122*b* provides an output which represents the digit in the $2^3$ place; the next group 122*c* the digit in the $2^2$ place and the next group 122*d* the digit in the $2^1$ place; in the lowermost group of cores 122*e*** is the digit in the $2^0$ place.

The pattern of occupancy of the transfer coils is then established. This may be seen from the fact that any A core which is driven from N to P as a result of an input of the three most significant figures of the addend and augend must apply magnetomotive forces to the cores in the B groups which express this sum. This sum must be expressed, however, with all the variations possible as a result of the adding or not adding of the two least significant figures and the carryover. Consequently, the possibilities require that cores in two or more groups of the B cores be coupled to each of the A cores. As an illustration, if the addend and augend had a zero in their three most significant figures, there are three possible sums as a result of the adding or not adding thereto the combinations of the two least significant figures and the carryover. This requires coupling the cores in the B groups **120*d*, 120*e* representing digit $2^1$ and $2^0$. The switch is not established to add all zeros in the addend and augend, although provision for this may also be made. However, excitation of the "one" coil 114*b* in the addend B input, the zero coil 116***a* in the augend B input and the zero coil 118*a* in the input carry will show that there must be a coupling between the fifth core from the top of the lowermost or $2^0$ group of cores 120*e* and the transfer coil. The inhibiting forces provided by exciting the right or "1" coil of the addend B input and the left or "0" coils of the augend and input carry coils inputs will not be applied to this core in the lowermost B core group. Taking as another example, the following addition:

0001
0001
————
0010 excitation of the B input coils will be applied to the "1" coil 114*b* in the addend input, to the "1" coil 116*b* in the augend input and the "0" coil 118*a* in the input carry. This will inhibit all the cores in the second core group representing output $2^1$ except the seventh core from the top of that core group. This seventh core consequently must be coupled to the transfer coil 70 connected to the core in the A group representing zero.

The couplings are not as complex as it would appear at first, since the same core in each of the B core groups is left uninhibited by any pattern of excitation applied to the B core group input. This is so by reason of the fact that the pattern of occupancy of the windings of the second input coils on the B cores is the same for each core group. Any pattern of excitation will result in only one core in each group being left inhibited. Accordingly, the decision for coupling or not coupling a particular transfer coil to that uninhibited core in each of the groups is determined in accordance with the result required for the addition being carried out. Restoration of all cores to the initial condition N is carried out in the same manner as was described for Figure 2 of the drawings. A common N restore coil 71 is provided for the A cores only. After each addition the N coil driving tube 70 has a signal applied thereto which restores all cores to condition N in the same manner as was described for Figure 3.

As a practical illustration of the operation of the switch shown, assume the following addition is to be carried out:

| | Decimal | Binary |
|---|---|---|
| Addend | 7 | 0111 |
| Augend | 4 | 0100 |
| Carryover | 1 | 1 |
| Decimal Sum | 12=Binary Sum. | 1100=1 carry 0010 Binary Coded Decimal Sum. |

Considering the three most significant figures of the augend, it may be seen that in the first sets of input coils designated as $2^3$, $2^2$ and $2^1$ input coils on the drawing, in the $2^3$ coil pair, the "0" coil 102*b* is excited, in the $2^2$ coil pair the "1" coil 104*a* is excited; in the $2^1$ coil pair, the "0" coil 106*b* is excited. In the addend, the $2^3$ coil pair has the "0" coil 108*b* excited, the $2^2$ coil pair has the "1" coil 110*a* excited, the $2^1$ coil pair has the "1" coil 112*a* excited. This results in a P magnetomotive force being applied only to the 12th core from the bottom of the A set of cores designated by the reference numeral 130.

Considering now the B input coil pairs, it will be seen that the addend least significant digit is a 1 and therefore the addend "1" coil 114*b* is excited. The augend least significant digit is a 0 and consequently the augend "0" coil 116*a* is excited, and the input carry digit is a 1 and consequently the "1" coil 118*b* is excited in that coil pair. This pattern of excitation to the groups of cores results in the third core from the bottom in each of the core groups not having any inhibiting magnetomotive forces applied thereto. Since the binary coded decimal sum of the example (which is 1 carry 0010) requires an output from the carryover output coil 122*a*, the $2^1$ output coil 120*d* and none others, the A core 130 which has been turned over must have its transfer coil coupled to the third from the bottom core in the carryover group designated by 132 and in the $2^1$ group designated by 134 and none of the other third from the bottom cores in the other B core groups. That this does occur may be seen by referring to the diagram shown in Figure 4.

It should be borne in mind that the addend, augend and input carry excitations are applied simultaneously to the respective tubes and not sequentially, so that an inhibiting force as a result of the B inputs may be effective simultaneously with the P drive from the transfer coil coupled to the A cores.

It may be noted that the particular switching function providing for binary coded decimal addition, has many simplifying features of which advantage may be taken to reduce the number of required cores. This was not done in Figure 4, in order to illustrate an example of a perfectly arbitrary function generator. The decimal addition was used merely as a convenient example in which the inputs and outputs are related so simply that no table is required for its specification. Actually, a further simplification is to omit the cores in the least significant digit of the sum which are not coupled to transfer coils. There are four of these. Therefore, only 61 (25+4×8+4) cores are required rather than the 65 which are shown on Figure 4, for the sake of generality.

A further reduction in the number of cores over those shown in Fig. 4 is secured in the adder of Figure 5. In this arrangement of Fig. 5, instead of two switches working in cascade, actually two switches drive a third. This type of switch is useful, in general, only when the switching function has regularities of a particular nature, such as the following: (1) Some outputs may depend exclusively on some of the inputs, in which case they may be derived directly from a commutator driven by the pertinent inputs only. (2) Some patterns of occupancy of windings of transfer coils on B cores may be identical for many B cores, i. e., to many combinations of B inputs. In that case these patterns need to be made only once and the proper one is selected by means of output coils 152 coupled to the cores of a third set of cores C, 150. Regarding Figure 5, the inputs which drive the A cores are the most significant figures of the augend and addend. The driving tubes and coils for expressing these figures are the same as was described in Figure 4 and will have similar reference numerals applied. The cores in each B core group 158*a–d* are far fewer in number. The A cores are selectively coupled to the B cores by transfer coils 73 as previously. The C cores 150 are driven by inputs which correspond to the B inputs in Figure 4, namely the least significant figures of the augend, addend and input carryover and consequently bear the same reference numerals. The output windings of the C cores, which may be considered a second set of transfer coils, are coupled to the B cores so as to provide an output for all the combinations of B inputs for which it is desired to have the same patterns of occupancy of coils on B cores belonging to respective A core outputs. The B cores tend to be driven to P by the A cores, and to N by the C cores, so that in some sense this device is a combination of the first and second embodiments of the present invention.

In the operation of the adder of Figure 5, all cores are initially at N. All 9 inputs, six driving the cores A and three the C cores, are excited simultaneously. This causes one of the 25 A cores to be driven to P and one of the 8 cores C to be driven to P. Now the selected A core will tend to drive the B cores, to which it is coupled by a transfer coil 73, to P. This tendency will be opposed successfully by the transfer coil 152 of the selected core C in all cases where the coil is coupled to the B core. Consequently, the B core which is coupled to a selected A core and not to a selected C core will be driven to P. The B cores which are coupled to a selected A core and C core will remain in condition N. The N restoration is obtained by restoring all three core sets A, B and C by a single tube 154 and N restore coil 156, all N restoring windings being in series.

The logic of the system is based on the peculiarities of the binary-coded-decimal addition of two decimal digits and the carry-over from the preceding decimal digits. The A inputs, as before, are the most significant digits of the addend and augend, and can be in 25 different combinations. The least significant digit of the addend and augend and the carry-over input digit, being all independent, can have 8 different combinations corresponding to the 8 C cores 150. The 8 different inputs will drive to P a different one of the eight C cores. The input coils are coupled to these cores with P and N windings in interleaved halves, then quarters, then eighths, whereby the single core selection for any given input occurs. It may be seen that all digits of a decimal sum except the least significant one depend on the three C inputs only insofar as the sum of these inputs is equal or greater than two or less than two. Consequently, the second transfer coil or the output winding of a C core is either coupled to all B cores corresponding to the sum of the three digits, which is 0 and 1, or the C core transfer coil is coupled to those B cores corresponding to sums 2 and 3. These two C core transfer coils 152 select one or the other of the B cores in each group to influence the digits of the sought sum in the proper manner. The parity of the sum of the three lowest order digits determines the least significant digit of the sought decimal sum, and is derived from a coil 160 coupled to all those C cores which represent the sum 1 or 3.

It is seen that this adder requires only 25+8+8=41 cores instead of the 61 (or 65) used in the example of Figure 4 or the 200 cores of the above mentioned application, Serial No. 289,913. This reduction is achieved by the use of commutators, two of which (A and B) can be used no matter what the switching function is, and the third is of advantage only when certain regularities are present in the switching function (although it can be used generally).

It may be noted that the idea of the switch of Figure 5 may be extended to include still more sets of commutators. Since the cores C have an inhibiting action on cores B, there could be still other sets, D, E, F etc. . . . which would also have inhibiting effects on the cores B. Thus, the $n$ inputs could be split into three (or more) groups. Whether this would result in overall economy has to be analyzed for each particular switching function.

In the invention shown in the above mentioned copending application Serial No. 289,913 filed May 24, 1952, with N inputs and M outputs in general $2^n$ cores were required. There were $M2^n$ possible locations of the output windings whose pattern of occupancy determine the desired switching function.

In the embodiment of the invention shown and described above, the N inputs are divided into two groups, A and B, so that $N=A+B$. The A inputs control a commutator switch containing $2^a$ cores with the output coils of these $2^a$ cores being coupled to $M2^b$ cores through windings whose occupancy pattern determines the desired switching function. There are therefore, $2^a+M2^b$ cores in the resulting switch. This number is less than $2^n$ in many applications requiring many inputs and few outputs. The M output windings are taken from each of the groups of the $2^b$ cores.

There has been, accordingly, described above, a novel, improved and unique magnetic switch capable of performing switching functions, including mathematical operations, interpreting a desired input into an output determined by the relationship of the pattern of the inputs applied thereto.

What is claimed is:

1. A magnetic switching system comprising a first plurality of magnetic cores, a plurality of groups of magnetic cores, said cores having substantially rectangular hysteresis loops, transfer coil means inductively coupling each of said first plurality of cores to cores in said groups of cores in accordance with a first desired code, means to apply magnetomotive driving forces to said first plurality of magnetic cores in accordance with a second code related to said desired code to drive one of said first plurality of cores from a given polarity, whereby the ones of said cores in said groups of cores which are inductively coupled to said one core receive magnetomotive driving forces, coil means to apply magnetomotive driving forces which are opposite to the magnetomotive forces applied by said transfer coil means to different cores in each of said groups of cores in accordance with a third code related to said desired code, whereby the only cores in said groups of cores which are driven from said given polarity are the ones receiving only one of said driving magnetomotive forces, and means to restore all said cores to said given polarity.

2. A magnetic switching system comprising a first plurality of magnetic cores, a plurality of groups of magnetic cores, said cores having substantially rectangular hysteresis loops, transfer coil means inductively coupling each of said first plurality of cores to cores in said group of cores in accordance with a desired code, means to apply magnetomotive driving forces to said first plurality of magnetic cores in accordance with a code related to said desired code to drive one of said first plurality of magnetic cores from a given condition of polarity, whereby the different ones of said cores in said plurality of groups of cores which are inductively coupled to said one core receive magnetomotive forces to drive them from a given condition of polarity, means to inhibit different ones of said cores in said plurality of groups of cores from being driven by said magnetomotive forces applied from said first plurality of cores, whereby only the uninhibited cores in each of said plurality of groups of cores are driven by said one core, and means to restore all said cores to said given condition of polarity.

3. A magnetic switching system as recited in claim 2 wherein said means to inhibit different ones of said cores in said plurality of groups of cores includes a second plurality of magnetic cores, a pair of coils, each of which is inductively coupled by windings to different ones of the cores in said groups of cores and to certain ones of the cores in said second plurality of cores, the sense of said last named windings being selected to provide when excited a magnetomotive force opposite to that provided by said transfer coil means, and means to selectively drive a desired one of said second plurality of cores from a given condition of magnetization, whereby a voltage is induced in the one of said pair of coils coupled thereto thereby providing an inhibiting magnetomotive force to said different ones of said cores in said groups to which said coil is coupled.

4. A magnetic switching system as recited in claim 2 wherein said means to inhibit different ones of said cores in said plurality of groups of cores includes a second pluralitf of input coil pairs, each of said coils in said second input coil pairs being coupled by windings to selected ones of the cores in said groups of cores in accordance with a desired code, the sense of said last named windings being selected to provide a magnetomotive force when excited which is opposite to the magnetomotive force provided by said transfer coil means.

5. A system as recited in claim 2 wherein said cores are toroidal in shape and are made of a magnetic material having a substantially rectangular hysteresis characteristic.

6. A magnetic switching system comprising a first plurality of magnetic cores, having an initial polarity, a second plurality of magnetic cores having an initial polarity, said cores having substantially rectangular hysteresis loops, a plurality of transfer coils, each of said transfer coils being coupled to a different one of said first plurality of cores and to selected ones of said second plurality of magnetic cores in accordance with one desired combinatorial code, a plurality of inhibiting coils coupled to selected ones of said second plurality of cores in accordance with another desired combinatorial code, means to drive a selected one of said first plurality of cores from its initial polarity to induce a voltage in the one of said plurality of transfer coils coupled thereto, whereby the ones of said second plurality of cores to which said transfer core is coupled have driving magnetomotive forces applied thereto, means to apply current to selected ones of said inhibiting coils to inhibit certain ones of said second plurality of cores from being driven from their initial polarity by said excited transfer coil coupled to them, whereby the uninhibited cores coupled to said excited output coil are driven from their initial polarity in accordance with the desired relationships established between said combinatorial codes, and means to restore all said driven cores to their initial condition of polarity.

7. A magnetic switch comprising a first plurality of magnetic cores having a substantially rectangular hysteresis characteristic and an initial magnetic polarity, a first plurality of pairs of coils, each of said coil pairs being inductively coupled to each of said cores by windings, the order of the sense of said windings on each core being representative of digits in a binary coded system, a second plurality of groups of magnetic cores having an initial magnetic polarity, a plurality of transfer coils, each of said transfer coils being inductively coupled by windings to a different one of said first plurality of magnetic cores and to selected ones in each of said groups of magnetic cores in accordance with a desired switching pattern, a plurality of output coils, each of said output coils being inductively coupled to all of the cores in a separate one of said groups, inhibiting coil means, said inhibiting coil means having windings to couple to selected ones of said cores within said groups of cores in accordance with a predetermined inhibiting code, said binary coded system, said switching pattern and said inhibiting code having a desired relationship, means to apply a current to one of each pair of said first plurality of pairs of coils whereby the core in said first plurality of cores is driven which has thereon excited windings which have only a sense to provide magnetomotive forces to drive said core from said initial magnetic polarity thereby inducing a voltage in the transfer coil coupled thereto, means to excite said inhibiting coil means to inhibit certain cores in each of said groups of cores which have driving forces applied thereto from said excited transfer coil whereby an output voltage is induced in the output coil of each of said core groups in which a core coupled to said excited transfer coil is not inhibited, and means to restore all said driven cores to their initial condition of magnetic polarity.

8. A magnetic function switch as recited in claim 7 wherein means to apply a current to said inhibiting coil means includes a third plurality of magnetic cores, a pair of coils, each of said pair of coils being inductively coupled, by windings to different ones of the cores in said groups of cores and to certain ones of the cores in said third plurality of cores, and said means to excite said inhibiting coil means includes means to selectively drive a desired one of said third plurality of cores from a given condition of polarity whereby the one of said pair of coils coupled to said driven core has a voltage induced therein.

9. A magnetic function switch as recited in claim 8 wherein said means to selectively drive a desired one of said third plurality of cores includes a second plurality of pairs of input coils, each coil pair being inductively coupled to each of said cores by windings having the order of their sense determined as representative of digits in a binary coded system related to the system of said first plurality of pairs of coils.

10. A magnetic switching system comprising a first plurality of magnetic cores, a first plurality of coils, each of said coils being inductively coupled to each of said cores by windings, the sense of said coupling windings being arranged on said cores in accordance with a first combinatorial code, a plurality of transfer coils, a second plurality of magnetic cores, each of said transfer coils being coupled by windings to a different one of said first plurality of cores and in accordance with a second combinatorial code to certain ones of said second plurality of magnetic cores, a second plurality of coils, each of said second plurality of coils being coupled by windings to certain ones of said second plurality of cores in accordance with a third combinatorial code, said first, second and third codes being interrelated, the sense of the coupling windings of said transfer coils being opposite to the sense of the coupling windings of said second plurality of coils whereby the simultaneous excitation of the windings on the same magnetic core provides a cancellation of effects, said cores having substantially rectangular hysteresis loops, means to apply current to selected ones of said first plurality of coils to excite all the windings in one sense on a selected one of said first plurality of cores, to drive only said selected core from an initial condition of polarity, thereby inducing a voltage in the one of said transfer coils coupled to said selected core, means to apply current to selected ones of said second plurality of coils simultaneously with the application of current to selected ones of said first plurality of coils whereby only the ones of said second plurality of cores which have uninhibited excited windings thereon are selected to be driven from an initial condition of polarity, and means to restore to their initial polarity said driven ones of said first and second plurality of cores.

11. A system as recited in claim 10 wherein said cores are toroidal in shape and are made of a magnetic material having a substantially rectangular hysteresis characteristic.

12. A magnetic function switch comprising a first and a second plurality of magnetic cores each having substantially rectangular hysteresis characteristics, said second plurality of cores being divided into groups of cores, a plurality of output coils, each of said groups of cores being coupled to a different one of said output coils, a first plurality of pairs of input coils, said pairs of coils being inductively coupled to each of said cores by windings, the sense of the windings of a coil pair on a core having one order to represent a binary one and the reverse order to represent a binary zero, the order of the sense of the windings of said input coil pairs being determined in accordance with a desired switching function table, a plurality of transfer coils, each of said transfer coils being coupled between a different one of said first plurality of cores and selected cores in said groups of cores in accordance with a code related to said desired table, a second plurality of pairs of input coils, each of said coils in said second plurality being coupled by windings to certain ones of said cores in each of said groups in accordance with a second code related to said table and said first code, the sense of the windings of said second plurality of pairs of input coils being opposite to the sense of the windings of said transfer coils, means to apply a current to a desired coil in each pair of said first pair of input coils, means to apply a current to a desired coil in each pair of said second input coils whereby the one of said first plurality of cores is driven from an initial condition of magnetization on which only windings having a sense to provide a driving magnetomotive force of the required polarity are excited, the pattern of the windings on said core being representative of the digits called for by the pattern of said coil exciting currents, said core being driven causing a voltage to be induced in the one of said transfer coils coupled thereto, thereby applying a magnetomotive force to the cores in said core groups coupled to said excited transfer coil to drive them from an initial condition of polarity, said excited ones of said second pairs of input coils inhibiting the drive to all but certain cores in said groups of cores in accordance with the predetermined codal relationship, the cores in said groups of cores which are driven from their initial condition of polarity inducing a voltage in the output coils to which they are coupled, said output coil voltage being representative of a result in accordance with the predetermined codal relationships established, and means to restore all said cores in said first and second pluralities of cores in an initial condition of polarity.

13. A system as recited in claim 12 wherein the relationships expressed in said switching table are those of binary additions with results expressed as binary coded decimal sums, a portion of said first input pairs of coils having their windings representing the higher order digits in the augends, the remaining ones of said first pairs of input coils having their windings representing the higher order digits in the addends, said second plurality of input coils having the windings of a coil pair representing the lowest order digits in the addends, the windings of a second coil pair representing the lowest order digits in the augends, the windings of a third coil pair representing a carryover digit, and an output in each of said output coils representing a digit in a binary coded decimal sum in accordance with the relationships established in said function table.

14. A magnetic function switch comprising a first and a second plurality of magnetic cores each having substantially rectangular hysteresis characteristics, said second plurality of cores being divided into groups of cores, a plurality of output coils, each of said groups of cores being coupled to a different one of said output coils, a first plurality of pairs of input coils, said pairs of coils being inductively coupled to each of said cores by windings, the sense of the windings of a coil pair on a core having one order to represent a binary one and the reverse order to represent a binary zero, the order of the sense of the windings of said input coil pairs being determined in accordance with a desired switching function table, a plurality of transfer coils, each of said transfer coils being coupled between a different one of said first plurality of cores and selected cores in said groups of cores in accordance with a code related to said table, a third plurality of magnetic coils, a pair of inhibiting coils, each of said pair of inhibiting coils being inductively coupled by windings to a different core in said groups of cores and to certain ones of the cores in said third plurality of cores, one of said output coils being coupled to windings to certain ones of said third plurality of cores in accordance with said first table, a second plurality of pairs of input coils, each of said second pairs of input coils being coupled to each of the cores in said third plurality of cores by windings, the order of the sense of said windings being determined in accordance with said first table of values, means to apply currents to a desired coil in each pair of said first and second pairs of input coils whereby the one of said first plurality of cores and the one of said second plurality of cores is driven from an initial condition of magnetization on which only windings having a sense to provide a driving magnetomotive force of the required polarity are excited, the pattern of the windings on each said driven core being representative of the digits called for by the pattern of said coil exciting currents, said driven core of said first plurality of cores causing a voltages to be induced in the transfer coil coupled thereto thereby applying a magnetomotive force to the cores in said core groups coupled to drive said cores from an initial condition of polarity, said driven core of said third plurality of cores causing a voltage to be induced in the one of said pairs of inhibiting coils coupled thereto whereby the drive from said excited transfer coil is inhibited by the drive from said excited inhibiting coil on all cores to which they are commonly coupled, the remaining ones of said groups of cores coupled to said excited transfer coil being driven, thereby inducing a voltage into the ones of said output coils coupled thereto, and means to restore all the cores of said first, second and third plurality of cores to said initial condition of polarity.

15. A system as recited in claim 14 wherein said means to restore to said initial condition of polarity all the cores of said first, second and third plurality of cores includes a coil coupled by windings to all the cores in said first and third plurality of cores.

16. A system as recited in claim 14 wherein the relationships expressed in said function table are those of binary additions with results expressed as binary coded decimal sums, a portion of said first input pairs of coils having their windings representing the higher order digits in the augends, the remaining ones of said first pair of input coils having their windings representing the higher order digits in the addends, said second input pairs of coils having the windings of one coil pair representing the lowest order digits in the addends, the windings of a second coil pair representing the lowest order digits in the augends, the windings of a third coil pair representing a carryover digit, and an output in each of said output coils representing a digit in a binary coded decimal sum in accordance with the relationships established in said function table.

17. A magnetic switching system comprising a first plurality of magnetic cores, a plurality of groups of magnetic cores, all said cores having rectangular hysteresis characteristics, transfer coil means inductively coupling each of said first plurality of cores to cores in said groups of cores in accordance with a first desired code, means to apply magnetomotive driving forces to said first plurality of magnetic cores in accordance with a second code related to said desired code to drive one of said first plurality of cores from a given polarity, whereby the ones of said cores in said groups of cores which are inductively coupled to said one core receive magnetomotive driving forces, coil means to apply magnetomotive driving forces which are opposite to the magnetomotive forces applied by said transfer coil means to different cores in each of said groups of cores in accordance with a third code related to said desired code, whereby the only cores in said groups of cores which are driven from said given polarity are the ones receiving only one of said driving magnetomotive forces, and means to restore all said cores to said given polarity.

18. A magnetic switching system comprising a first plurality of magnetic cores, a plurality of groups of magnetic cores, all said cores having rectangular hysteresis characteristics, transfer coil means inductively coupling each of said first plurality of cores to cores in said group of cores in accordance with a desired code, means to apply magnetomotive driving forces to said first plurality of magnetic cores in accordance with a code related to said desired code to drive one of said first plurality of magnetic cores from a given condition of polarity, whereby the different ones of said cores in said plurality of groups of cores which are inductively coupled to said one core receive magnetomotive forces to drive them from a given condition of polarity, means to inhibit different ones of said cores in said plurality of groups of cores from being driven by said magnetomotive forces applied from said first plurality of cores, whereby only the uninhibited cores in each of said plurality of groups of cores are driven by said one core, and means to restore all said cores to said given condition of polarity.

19. A magnetic switching system comprising a first plurality of magnetic cores, having an initial polarity, a second plurality of magnetic cores having an initial polarity, all said cores having rectangular hysteresis characteristics, a plurality of transfer coils, each of said transfer coils being coupled to a different one of said first plurality of cores and to selected ones of said second plurality of magnetic cores in accordance with one desired combinatorial code, a plurality of inhibiting coils coupled to selected ones of said second plurality of cores in accordance with another desired combinatorial code, means to drive a selected one of said first plurality of cores from its initial polarity to induce a voltage in the one of said plurality of transfer coils coupled thereto, whereby the ones of said second plurality of cores to which said transfer core is coupled have driving magnetomotive forces applied thereto, means to apply current to selected ones of said inhibiting coils to inhibit certain ones of said second plurality of cores from being driven from their initial polarity by said excited transfer coil coupled to them, whereby the uninhibited cores coupled to said excited output coil are driven from their initial polarity in accordance with the desired relationships established between said combinatorial codes, and means to restore all said driven cores to their initial condition of polarity.

References Cited in the file of this patent

Progress Report (2) on the EDVAC, Moore School, Univ. of Pa., June 30, 1946; declassified February 13, 1947; pages 4–22 and 4–23, Drawings PY–0164 and PY–O–165;

Digital Information Storage in Three Dimensions Using Magnetic Cores, J. W. Forrester, Journal of Applied Physics, volume 22, No. 1, January 1951, pages 44–48.

Some Basic Concepts of Translators, H. H. Schneckloth, Bell System, Technical Journal, July 1951; pages 603–605, relied upon.

Olsen: A Magnetic Matrix Switch and Its Incorporation Into a Coincident-Current Memory; Report R–211, Digital Computer Laboratory—M. I. T., June 6, 1952.